United States Patent [19]
Cilke et al.

[11] Patent Number: 5,912,746
[45] Date of Patent: Jun. 15, 1999

[54] CONTACT IMAGE SENSOR FOR LARGE FORMAT SCANNER

[75] Inventors: J. Thomas Cilke; Gregory A. Baxes; Curtis A. Lipkie, all of Littleton, Colo.

[73] Assignee: Intergraph Corporation, Huntsville, Ala.

[21] Appl. No.: 08/814,763

[22] Filed: Mar. 10, 1997

Related U.S. Application Data

[60] Provisional application No. 60/013,402, Mar. 14, 1996.

[51] Int. Cl.⁶ .................................................. H04N 1/04
[52] U.S. Cl. ........................ 358/482; 358/494; 250/208.1
[58] Field of Search ................................ 358/494, 482, 358/496, 474, 475, 471; 250/208.1

[56] References Cited

U.S. PATENT DOCUMENTS

| | | | |
|---|---|---|---|
| 4,318,135 | 3/1982 | Allis et al. | 358/294 |
| 4,542,414 | 9/1985 | Nagane | 358/285 |
| 4,680,644 | 7/1987 | Shirato et al. | 358/474 |
| 4,686,581 | 8/1987 | Spehrley, Jr. et al. | 358/494 |
| 4,783,700 | 11/1988 | Nagane | 358/471 |
| 4,792,670 | 12/1988 | Fukaya et al. | 250/214.1 |
| 4,920,431 | 4/1990 | Ogura et al. | 358/474 |
| 4,970,607 | 11/1990 | Itagaki et al. | 250/208.1 |
| 5,101,285 | 3/1992 | Kawai et al. | 358/471 |
| 5,162,644 | 11/1992 | Nagata et al. | 250/208.1 |
| 5,187,595 | 2/1993 | Kitani et al. | 358/482 |
| 5,187,596 | 2/1993 | Hwang | 358/482 |
| 5,434,682 | 7/1995 | Imamura et al. | 358/474 |
| 5,477,329 | 12/1995 | Imamura | 358/482 |
| 5,489,992 | 2/1996 | Endo | 358/482 |
| 5,489,995 | 2/1996 | Iso et al. | 358/474 |
| 5,570,204 | 10/1996 | Kumashiro | 358/471 |
| 5,579,114 | 11/1996 | Imamura | 358/482 |

*Primary Examiner*—Jon Chang
*Assistant Examiner*—Jingge Wu
*Attorney, Agent, or Firm*—Bromberg & Sunstein LLP

[57] ABSTRACT

A scanner for scanning an image on a large-format medium and generating image information. The scanner includes a secondary substrate mounted to the frame and having a length spanning the width of the medium, and a plurality of sensor boards disposed on the secondary substrate. A plurality of sensor dies are mounted on each of the sensor boards. The scanner further includes a lens strip, mounted to the frame between the sensor dies and the moving means. Preferably, a die on each end of each sensor board overhangs the end of the board, and the sensor boards are mounted on the secondary substrate so that dies overhanging ends of the sensor boards are butted against each other. The sensor dies may be wired in groups, so that image information read from the sensors in a group passes through the same data path; image information is read from a first set of sensor dies, wherein only one sensor die from each group is in the first set; and immediately after reading image information from the first set of sensor dies, image information is read from a second set of sensor dies, wherein only one sensor die from each group is in the second set, and wherein each of a plurality of sensor dies in the second set is separated by at least one other sensor die from the sensor die in the first set that is in the same group.

13 Claims, 3 Drawing Sheets

CONTACT IMAGE SENSOR FOR LARGE FORMAT SCANNER

RELATED APPLICATION

The present application claims priority from provisional application no. 60/013,402 filed Mar. 14, 1996 and listing Cilke, Baxes, Lipkie and Larsen as inventors. This provisional application is incorporated herein by reference.

DESCRIPTION

1. Technical Field

This invention generally relates to devices for scanning images on a medium, and specifically to devices capable of scanning large-format media (i.e., greater than thirty inches wide) with high-resolution. The invention also relates to methods for manufacturing such devices and to methods for processing the scanned information.

2. Background of the Invention

Some prior-art facsimile machines use arrays of phototransistors and selfoc lenses, which are formed of light pipes, to scan a document. The phototransistors are formed in a line on sensor dies, which in turn are mounted on a board in a line. Light from the document being scanned passes through the selfoc lens and lands on the phototransistors. The light pipes are arranged in a long, somewhat flexible strip that spans the width of the document being scanned.

The selfoc lens is able to transmit a one-to-one, non-inverted image from the document to the sensors. The selfoc lens have a very small depth of field, but since facsimile machines do not require fine detail this limitation has not hindered the use of selfoc lenses in facsimile machines.

SUMMARY OF THE INVENTION

The invention is directed to a scanner for scanning an image on a medium, such as paper, and generating image information. The device includes means, such as a roller, mounted to a frame, for moving the medium along a first axis transverse to the medium's width, and means, such as an LED array, for illuminating a portion of the medium across the width of the medium. The scanner also includes a secondary substrate mounted to the frame and having a length spanning the width of the medium, and a plurality of sensor boards disposed on the secondary substrate. A plurality of sensor dies are mounted on each of the sensor boards, so that the sensor dies on all of the sensor boards form a line spanning the medium's width. The sensor dies provide a signal representative of a portion of the image within the illuminated portion of the medium. The scanner further includes lens means, mounted to the frame between the sensor dies and the moving means, for focusing light from the medium's illuminated portion onto the sensor dies. Preferably, a die on each end of each sensor board overhangs the end of the board, and the sensor boards are mounted on the secondary substrate so that dies overhanging ends of the sensor boards are butted against each other. In a preferred embodiment, each sensor die includes an array of phototransistors and the lens means includes a selfoc lens assembly.

In a preferred arrangement, the scanner includes a metal bar mounted to the frame and spanning the width of the medium. The metal bar has two sides perpendicular to each other and against which sensor boards and the lens assembly are mounted. In another preferred arrangement, the scanner has a housing that may be subject to vibration and distortion, but further includes isolation means for shock-mounting the frame to the housing at only three-spaced apart locations, such that the sensor dies, the lens means and the roller tend to be isolated from the vibration of the housing and from torsional forces that might otherwise result from distortion of the housing.

In a preferred embodiment, the sensor dies are wired in groups, so that image information read from the sensors in a group passes through the same data path; image information is read from a first set of sensor dies, wherein only one sensor die from each group is in the first set; and immediately after reading image information from the first set of sensor dies, image information is read from a second set of sensor dies, wherein only one sensor die from each group is in the second set, and wherein each of a plurality of sensor dies in the second set is separated by at least one other sensor die from the sensor die in the first set that is in the same group. In an alternative embodiment, one group of sensors is read consecutively in a first direction, and a second group of sensors is read consecutively in a direction opposite the first direction.

Objects and advantages of this invention will become apparent from the following description taken in conjunction with the accompanying drawings wherein are set forth, by way of illustration and example, certain embodiments of this invention.

DESCRIPTION OF THE SPECIFIC EMBODIMENTS

Figure 1:
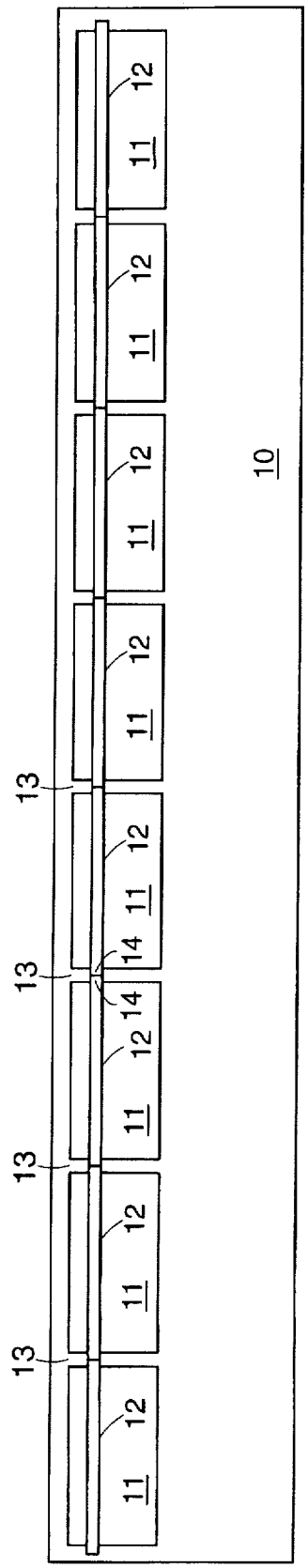
FIG. 1 shows a bottom view of the scanning sensor array mounted according to a preferred embodiment of the invention.
Figure 2:
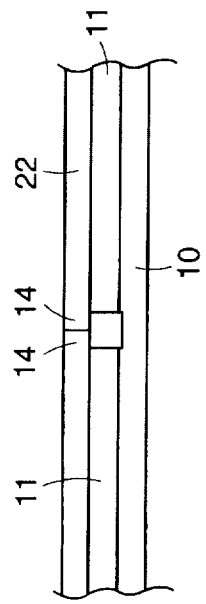
FIG. 2 shows a partial front view of the mounting arrangement shown in FIG. 1.

FIGS. 1 and 2 show a preferred method of mounting the sensor dies 22 according to the present invention. Each sensor die contains 128 sensors (e.g., phototransistors) and is 0.32 inches long. An array 12 of fifteen dies are mounted in a line on each sensor board 11; eight sensor boards 11 in turn are mounted on a secondary substrate 10 so that all the dies line up. This arrangement creates a scannable swath 38.4 inches long. In order to ensure that there are no gaps in the line of sensors covering the scannable swath, a portion 14 of a die 22 overhangs each end of a sensor board 11 (see FIG. 2), and the ends of overhanging dies 22 on adjacent sensor boards 11 are butted against each other. The overhanging portions 14 result in a space 13 between adjacent sensor boards 11. By mounting the 120 dies on eight separate sensor boards 11, fewer dies need to discarded when a die is found to be defective or defectively mounted to the board. The sensor boards 11 are preferably removably attached, not bonded, to the secondary substrate 10 so as to make the system easier to repair; a single sensor board 11 may be replaced instead of the entire secondary substrate 10.

Figure 3:
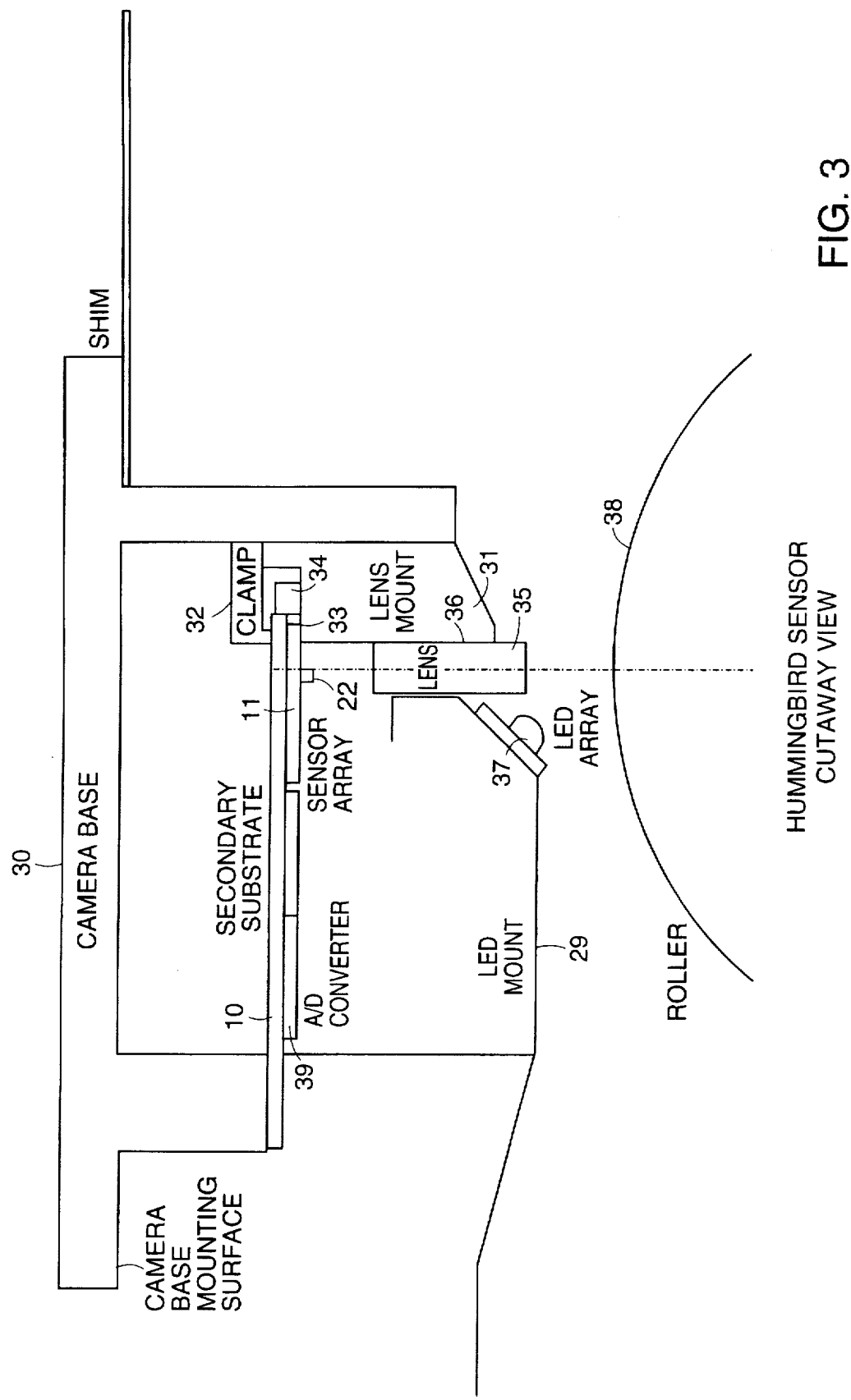
FIG. 3 shows a side view of the sensor array along with other components of the scanner.

FIG. 3 shows a side view of the assembly of the secondary substrate 10, sensor boards 11 and dies 22 shown in FIG. 1, along with other components of the scanning system. Additional electronics 39, such as an analog-to-digital converter, for processing the signals from the sensors are mounted on the secondary substrate 10 instead of on the individual sensor boards 11. Preferably, only a minimum of electronics, such as capacitors, that need to be mounted in close proximity of the sensors, are mounted on the sensor boards 11. This arrangement further reduces the amount of dies or other electronic components that need to be discarded when a defect is discovered.

The assembly of the secondary substrate 10, sensor boards 11 and dies 22 is placed on a metal lens mount 31 and held in place by a clamp 32 that is attached directly to the lens mount 31. The lens mount 31 includes a pair of alignment pins 34 against which the edge of the secondary substrate 10 is abutted. The alignment pins 34 ensure that the dies 22 are lined up parallel to the lens side 36 of the lens mount 31.

A selfoc lens array 35 is mounted to the lens side 36 of the lens mount 31. Selfoc lens arrays tend to be somewhat flexible, but it is important that the lens array 31 be mounted so that the top of the lens array 35 is a constant distance from the sensor side 33 of the lens mount 31. L-shaped spacers may be used to ensure that the lens array 35 is kept straight and properly positioned while being mounted to the lens mount 31. The sensor side 33 and the lens side 36 should be flat and perpendicular to each other. The secondary substrate 10, sensor board 11 and die 22 assembly is placed on the lens mount 31 so that the bottom surface (i.e., the surface on which the sensor dies 22 are mounted) is placed directly against the sensor side 33 of the lens mount 31. This arrangement ensures that the sensor dies 22 are properly positioned a fixed distance away from the top surface of the lens array 35.

The lens mount 31, to which is mounted the lens array 35, the eight sensor boards 11 (including the sensor dies 22) and the secondary substrate 10, is in turn mounted to a sensor-assembly base 30. An LED mount 29 is also mounted to the base 30; and array of LEDs 37 is mounted on the LED mount. The LEDs 37 illuminate the portion of the document being scanned. The document is moved past the selfoc lens 35 and sensor dies 22 by a roller 38. Because of the selfoc lens's very small depth of field, it is important that the document (and more precisely the top surface of the document, where the image is typically located) be kept a set, exact distance away from the bottom of lens 35, as it is important to keep the sensor dies 22 a set, exact distance away the top of the lens 35. By assuming the document has a certain thickness (e.g., 0.005 inches), the roller 38 may be positioned the appropriate distance away from the base 30 by a frame. Shims may be used to adjust the height of the base 30 over the roller 38.

Figure 4:
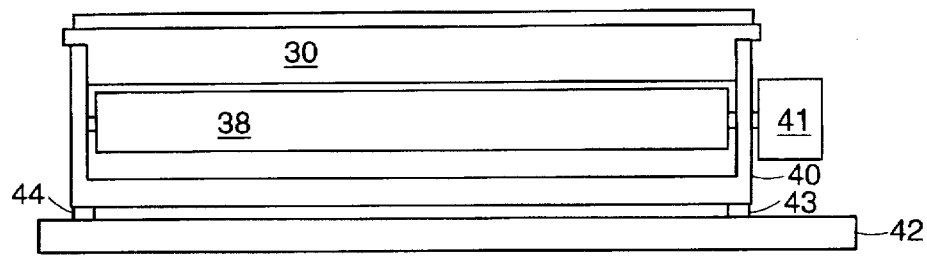
FIG. 4 shows a front view of the scanner.

FIG. 4 shows a front view of the scanner system. The sensor-assembly base 30, the roller 38 and the motor that turns the roller 41 is mounted to a frame 40. The frame is mounted on a scanner base 42 preferably by a three-point mounting system as described in U.S. Pat. No. 4,686,581 to Spehrley, Jr. et al. (reissued Dec. 31, 1991 as Re. 33,783). As in the system disclosed in Spehrley, Jr. et al. patent, two pairs of shock mounts 43, 44 (only one shock mount of each pair is visible in the FIG. 4 view) may be used with one pair being mounted adjacent each other while the other pair is spaced apart, so as to form a three-point mounting system. If the scanner base 42 is distorted, the orientation of the plane defined by the three mounting points may be altered, but the distortion is not transmitted to the frame 40.

Figure 5:
FIG. 5 depicts an exaggerated stitching-like pattern in a scanned line.

For ease of handling the image information regarding the image being scanned, adjoining sensor dies are preferably wired in groups so that the image information generated by the dies in the same group passes through the same data pathway. When an image is scanned in this manner, a straight horizontal line in the original image may when plotted appear "stitched," as shown in exaggerated form in FIG. 5. The more dies in each group of dies, the more apparent the stitching. One way of reducing the stitching effect is to reduce the number of dies in each group; however, this solution requires additional data pathways needed to handle the image information.

Figure 6A:
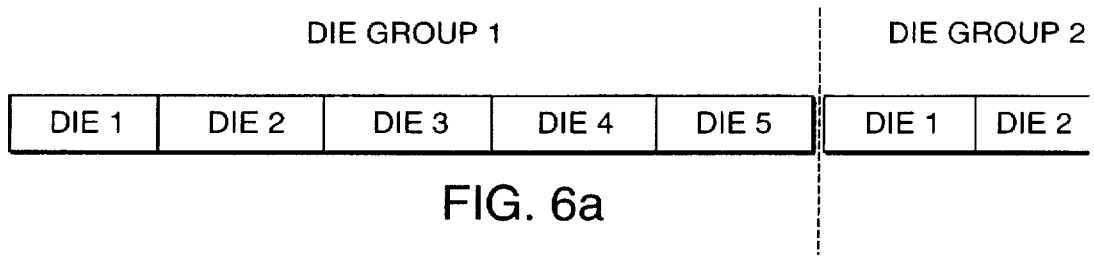
FIG. 6 shows how information may be read from sensor dies in order to reduce stitching.
Figure 6B:
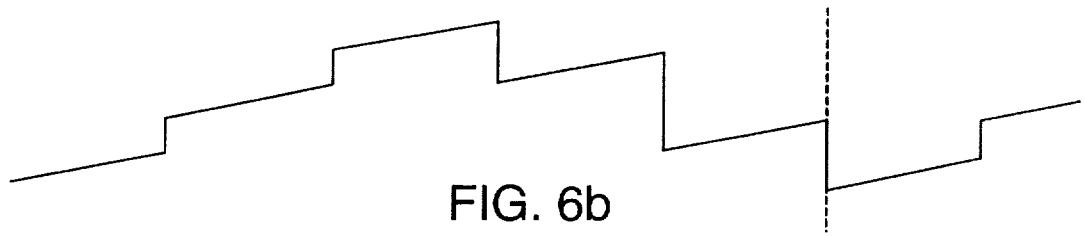
Figure 6C:

In one embodiment of the invention, schematically represented in FIG. 6, the dies are wired in groups of five. In order to reduce further the amount of apparent stitching, the dies in each group are read in a non-consecutive manner, so that the number of locations where stitching occurs is greater but the amount of stitching at each location is significantly less than the amount of stitching that would occur between groups if the dies were read in a consecutive manner. An example of such a method is shown in part (b) of FIG. 6: The first die in die group 1 is read first and at the same time as the first die in die group 2. Then, instead of proceeding to the next die (die 2), die 5 is read. Die 2 may then be read, then die 4 and finally die 3, producing the pattern shown in exaggerated form in part (b) of FIG. 6. The greatest amount of stitching, between dies 4 and 5, is only three-fifths the size of the stitching that would occur if the dies were read consecutively left-to-right. Although when the dies are read non-consecutively stitching occurs in many more places (between nearly every pair of dies, instead of just between die groups), such a pattern is less noticeable when plotted than the stitching that occurs when the dies are read consecutively left-to-right.

When the dies are read in a non-consecutive manner as just described, it is preferred that the order that the dies are read in each group vary somewhat in order to minimize further the possibility of aliasing. For instance, in die group 1, the dies may be read in the order: first, fifth, second, fourth and third (as just discussed above and shown in part (b) of FIG. 6); and in die group 2, the dies may be read first, fifth, fourth, second and third; and in die group 3, the dies may be read fifth, first, fourth, second and third, etc.

An alternative method of reducing apparent stitching involves reading the sensors in the dies in opposite directions. For instance, all the sensors in die group 1 may be read consecutively from left to right, and all the sensors in die group 2 may be read consecutively from right to left, so that the first die in group 1 is read at the same time as the fifth die in group 2, and the fifth die in group 1 is read at the same time as the first die in group 2. Such a method produces the pattern shown in part (c) of FIG. 6: the rightmost sensor in group 1 is read at the same time as the leftmost sensor in group 2, so that no stitching is apparent in the line.

Although the invention has been described with reference to several preferred embodiments, it will be understood by one of ordinary skill in the art that various modifications can be made without departing from the spirit and the scope of the invention, as set forth in the claims hereinbelow.

We claim:

1. A device for scanning an image on a large-format medium having a width and providing signals representing the image, the device comprising:

a frame;

means, mounted to the frame, for moving the medium along a first axis transverse to the medium's width;

means for illuminating a portion of the medium across the width of the medium;

a secondary substrate mounted to the frame so that the medium passes between the secondary substrate and the moving means, the secondary substrate having a length spanning the width of the medium;

a plurality of sensor boards disposed on the secondary substrate between the secondary substrate and the moving means;

a plurality of sensor dies mounted on each of the sensor boards between the sensor board and the moving means, each sensor die having a plurality of sensors, wherein the sensor dies on all of the sensor boards form a line spanning the medium's width, the sensors providing a signal representative of a portion of the image within the illuminated portion of the medium; and means, mounted to the frame between the sensor dies and the moving means, for focusing light from the medium's illuminated portion onto the sensor dies, wherein the means for focusing is substantially parallel to the plurality of sensor dies.

2. A device according to claim 1, wherein a die on each end of each sensor board overhangs the end of the board, and wherein the sensor boards are mounted on the secondary substrate so that dies overhanging ends ot the sensor boards are butted against each other.

3. A device according to claim 1, further including electronic means, mounted on the secondary substrate, for processing the signal from the sensors.

4. A device according to claim 3, wherein the electronic means includes means, mounted on the secondary substrate, for converting an analog signal to a digital signal.

5. A device according to claim 1, wherein each sensor die includes an array of phototransistors and the focusing means includes a selfoc lens assembly.

6. A device according to claim 1, wherein the focusing means includes a selfoc lens assembly.

7. A device according to claim 6, further including a metal bar mounted to the frame and spanning the width of the medium, the metal bar having a sensor side and a lens side perpendicular to each other, wherein the side of the sensor board on which the sensor dies are mounted is positioned against metal bar's sensor side and wherein the lens assembly is mounted against the metal bar's lens side.

8. A device according to claim 1, further including a housing that is subject to vibration and distortion; and isolation means for shock-mounting the frame to the housing at only three spaced-apart locations, such that the sensor dies, the focusing means and the moving means tend to be isolated from the vibration of the housing and from torsional forces that might otherwise result from distortion of the housing.

9. A method for making a scanner comprising the steps of:

mounting a plurality of sensor dies along a line on a first side of each of a plurality of sensor boards;

mounting the sensor boards on a secondary substrate so that the sensor dies are arranged in a line, wherein a die on each end of each sensor board overhangs the end of the board, and wherein the dies overhanging ends of the sensor boards are butted against each other;

providing a metal bar with first and second sides, wherein the first and second sides of the metal bar are perpendicular to each other;

providing a lens assembly having two faces through which light may pass;

mounting the lens assembly on the first side of the metal bar such that the lens assembly's face's are straight and parallel to the metal bar's second side;

mounting the secondary substrate so that first side of each of the sensor boards is positioned against the second side of the metal bar, so that the line along which the sensor dies are arrayed is parallel to the metal bar's first side, and so that the sensor dies are aligned with the lens assembly;

mounting the metal bar to a frame; and mounting to the frame means for moving a media past the lens assembly.

10. A method according to claim 9, further including the steps of providing a housing that is subject to vibration and distortion, and shock-mounting the frame to the housing at only three-speed apart locations, such that the sensor dies, the lens assembly and the moving means tend to be isolated from the vibration of the housing and from torsional forces that might otherwise result from distortion of the housing.

11. A method according to claim 9, wherein the lens assembly includes a selfoc lens assembly.

12. A method of scanning an image on a medium, the method comprising:

providing an array of sensor dies, wherein each sensor die includes a plurality of sensors disposed along a line;

mounting the sensor dies so that the sensors are arranged along a continuous line spanning the medium;

wiring the sensor dies in groups, so that image information read from the sensors in a group passes through the same data path;

moving the medium in a direction transverse to the line of sensors;

reading image information from a first set of sensor dies, wherein within each sensor die the sensors are read consecutively, and wherein only one sensor die from each group is in the first set; and immediately after reading image information from the first set of sensor dies, reading image information from a second set of sensor dies, wherein within each sensor die the sensors are read consecutively, wherein only one sensor die from each group is in the second set, and wherein each of a plurality of sensor dies in the second set is separated by at least one other sensor die from the sensor die in the first set that is in the same group.

13. A method of scanning an image on a medium, the method comprising:

providing an array of sensors disposed along a continuous line spanning the medium;

wiring the sensors in groups, so that image information read from the sensors in a group passes through the same data path;

moving the medium in a direction transverse to the line of sensors; and reading image information from one group of sensors consecutively in a first direction, and sensors in an adjoining, second group ot sensors are read consecutively in a direction opposite the first direction.

* * * * *

UNITED STATES PATENT AND TRADEMARK OFFICE
CERTIFICATE OF CORRECTION

PATENT NO. : 5,912,746

DATED : June 15, 1999

INVENTOR(S) : Cilke et al.

It is certified that error appears in the above-identified patent and that said Letters Patent is hereby corrected as shown below:

Column 5, line 23, change "ot" to --of--

Signed and Sealed this

Second Day of November, 1999

Attest:

Attesting Officer

Q. TODD DICKINSON

Acting Commissioner of Patents and Trademarks